(12) United States Patent
Knepler

(10) Patent No.: US 8,210,093 B2
(45) Date of Patent: Jul. 3, 2012

(54) LIME TOLERANT BREWING SYSTEM AND METHOD

(75) Inventor: John T. Knepler, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 1004 days.

(21) Appl. No.: 12/091,800

(22) PCT Filed: Oct. 30, 2006

(86) PCT No.: PCT/US2006/060356
§ 371 (c)(1),
(2), (4) Date: Apr. 28, 2008

(87) PCT Pub. No.: WO2007/051200
PCT Pub. Date: May 3, 2007

(65) Prior Publication Data
US 2008/0282898 A1    Nov. 20, 2008

Related U.S. Application Data

(60) Provisional application No. 60/731,115, filed on Oct. 28, 2005.

(51) Int. Cl.
*A47J 31/00* (2006.01)
*B67D 3/00* (2006.01)

(52) U.S. Cl. .................. 99/280; 99/258; 99/307; 222/1; 222/52; 222/146.2; 222/639; 222/640; 222/644

(58) Field of Classification Search ................. 222/1, 52, 222/639, 640, 644, 146.2; 426/433; 99/280, 99/283, 285, 305, 306, 307
See application file for complete search history.

(56) References Cited

U.S. PATENT DOCUMENTS

| | | | |
|---|---|---|---|
| 4,653,389 A * | 3/1987 | Hayes | ............................ 99/280 |
| 5,195,422 A | 3/1993 | Newnan | |
| 5,372,061 A | 12/1994 | Albert et al. | |
| 5,623,574 A * | 4/1997 | Knepler | ........................ 392/451 |
| 5,671,113 A | 9/1997 | Knepler | |
| 6,003,435 A | 12/1999 | Patel | |
| 6,510,782 B1 | 1/2003 | Blaschke | |
| 7,228,066 B2 * | 6/2007 | Pope | ............................ 392/441 |

OTHER PUBLICATIONS

International Search Report issued in corresponding application No. PCT/US06/60356 (2008).

* cited by examiner

*Primary Examiner* — Reginald L Alexander
(74) *Attorney, Agent, or Firm* — Barnes & Thornburg LLP

(57) ABSTRACT

Disclosed is a system and method of dispensing a selected volume of liquid. The system includes an apparatus that has a reservoir having an inlet tube and outlet tube coupled thereto, and a controller for controlling at least a portion of the apparatus. Two level sensors are positioned along the reservoir and are in communication with and controlled by the controller. The method includes steps for measuring a time a liquid level in the reservoir falls from an upper level to a lower level to calculate a flow rate. The calculation flow rate may then be used to determine and compare a dispensed volume versus the selected volume. Dispensing may then continue until the selected volume has been dispensed.

18 Claims, 5 Drawing Sheets

FIG. 3
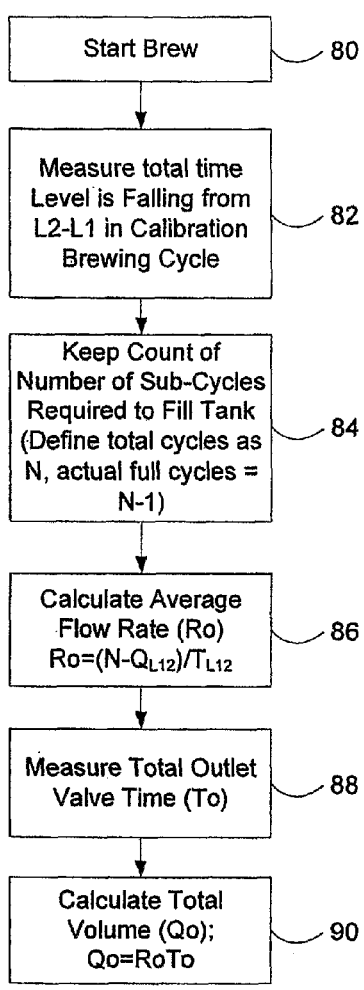
FIG. 4
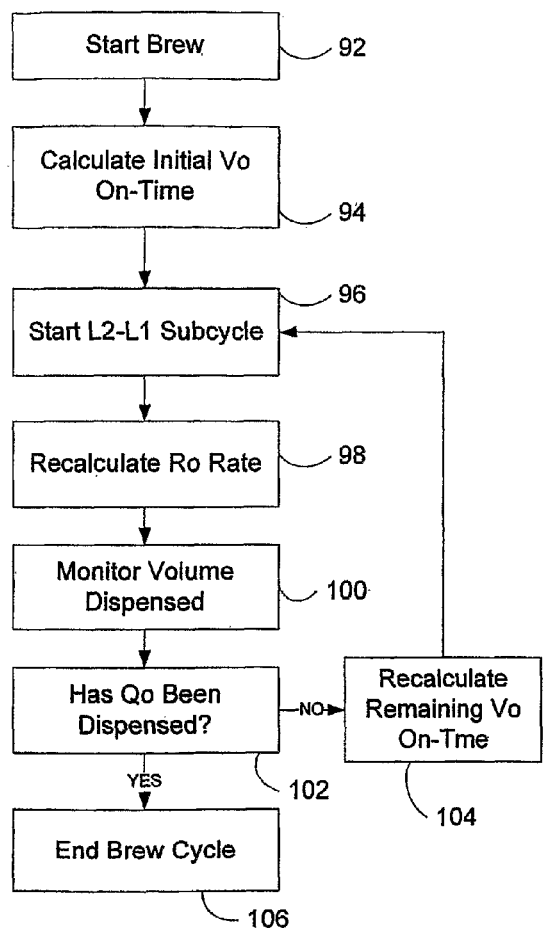
FIG. 5
$$TRn = Tn(\frac{TOl}{TL12} - \frac{TD1}{T1} - \frac{TD2}{T2} - \frac{TD3}{T3} - \ldots \frac{TDn}{Tn})$$
110

FIG. 6A

DURING THE CALIBRATION CYCLE MEASURE TOTAL $V_o$ = ON-TIME, $T_o$ $$R_o = \frac{Q_{L12}}{T_{L12}} \qquad Q_o = Q_{L12}\frac{T_o}{T_{L12}}$$

THEN, FOR THE SIMPLE OPERATION DESCRIBED ABOVE, $$R_o = \frac{Q_{L12}}{T_{L12'}} \qquad \text{VALUES INDICATE OPERATING CYCLE VALUE}$$

$T_o$ MUST BE CORRECTED TO A NEW VALUE, $T_{o'}$ TO ALLOW FOR THE ACTUAL OPERATING FLOW RATE, $R_o$ $$T_{o'} = \frac{Q_o}{R_o} = \frac{\left(Q_{L12} \cdot \frac{T_o}{T_{L12}}\right)}{\frac{Q_{L12}}{T_{L12'}}}$$

$$T_{o'} = \frac{T_o}{T_{L12}} \times T_{L12'}$$

WHEN AN OPERATION CYCLE STARTS, $V_o$ TURNS ON AND $T_3$ IS RECORDED, CALCULATE $$R_{o1} = \frac{Q_{L12}}{T_1} \text{ AND } Q_{o1} = R_{o1} \times T_{o1} = Q_{L12} \cdot \frac{T_{D1}}{T_1}$$

THEN THE REMAINING VOLUME TO BE DISPENSED AT THE END OF $T_1$ IS
$$Q_{R1} = Q_o - Q_{o1}$$

THE REMAINING $V_o$ ON-TIME
$$T_{R1} = \frac{Q_{R1}}{R_{o1}}$$

SUBSTITUTING -

$$T_{R1} = \frac{Q - Q_{L12}\left(\frac{T_{D1}}{T_1}\right)}{\frac{Q_{L12}}{T_1}}$$

$$T_{R1} = \frac{Q_o}{Q_{L12}} T_1 - T_{o1}$$

AFTER ANOTHER CYCLE -

$$R_{O2} = \frac{Q_{L12}}{T_2} \qquad Q_{o2} = R_{o2} \times T_{D2} = Q_{L12}\frac{T_{D2}}{T_2}$$

$$Q_{R2} = Q_o - Q_{o1} - Q_{o2} = Q_{R1} - Q_{o2}$$

$$T_{R2} = \frac{Q_{R2}}{R_{o2}}$$

FIG 6B

SUBSTITUTE $$T_{R2} = \frac{Q_o - Q_{o1} - Q_{o2}}{R_{o2}}$$

$$T_{R2} = \frac{Q_o - Q_{L12}\frac{T_{D1}}{T_1} - Q_{L12}\frac{T_{D2}}{T_2}}{\frac{Q_{L12}}{T_2}}$$

$$T_{R2} = (Q_o - Q_{L12}\frac{T_{D1}}{T_1})\frac{T_2}{Q_{L12}} - Q_{L12}\frac{T_{D2}}{T_2} X \frac{T_2}{Q_{L12}}$$

$$T_{R2} = \frac{Q_o}{Q_{L12}}T_2 - \frac{T_{D1}}{T_1}T_2 - T_{D2}$$

AFTER A THIRD CYCLE $$R_{o3} = \frac{Q_{L12}}{T_3} \quad Q_{o3} = R_{o3} \times T_{D3} = Q_{L12}\frac{T_{D3}}{T_3}$$

$$Q_{R3} = Q_o - Q_{o1} - Q_{o2} - Q_{o3}$$

$$T_{R3} = \frac{Q_{R3}}{R_{o3}} = \frac{Q_o - Q_{o1} - Q_{o2} - Q_{o3}}{R_{o3}}$$

$$= \frac{Q_o - Q_{L12}\frac{T_{D1}}{T_1} - Q_{L12}\frac{T_{D2}}{T_2} - Q_{L12}\frac{T_{D3}}{T_3}}{\frac{Q_{L12}}{T_3}}$$

$$T_{R3} = \frac{Q_o}{Q_{12}}T_3 - \frac{T_{D1}}{T_3}T_3 - \frac{T_{D2}}{T_2}T_3 - T_{D3}$$

TOTAL ELAPSED TIME = $T_E = T_{D1} + T_{D2} + T_{D3} + ... T_{Dn}$

LOOKS LIKE IN GENERAL:

$$T_{RN} - T_N (\frac{Q_o}{Q_{L12}} - \frac{T_{D1}}{T_1} - \frac{T_{D2}}{T_2} - \frac{T_{D3}}{T_3} ... \frac{T_{Dn}}{T_n})$$

RECALL THAT DURING CALIBRATION, $T_O$ AND THE AVERAGE $T_{L12}$ WERE DETERMINED.

SINCE $R_o = \frac{Q_{L12}}{T_{L12}}$ AND $Q_o = R_o T_o$

THEN $Q_o - \frac{Q_{L12}}{T_{L12}}T_o$

AND $\frac{Q_o}{Q_{L12}} = \frac{T_o}{T_{L12}}$

SUBSTITUTING IN $T_{RN}$ $$T_{RN} = T_N (\frac{T_o}{T_{L12}} - \frac{T_{L1}}{T_1} - \frac{T_{D2}}{T_2} - \frac{T_{D3}}{T_3} ... \frac{T_{Dn}}{T_n})$$

LIME TOLERANT BREWING SYSTEM AND METHOD

CROSS-REFERENCE TO RELATED PATENT APPLICATIONS

This patent application is a U.S. Nationalization of international patent application no. PCT/US2006/060356, filed Oct. 30, 2006, which claims priority under 35 U.S.C. §119(e) to U.S. Provisional Patent Application No. 60/731,115, filed Oct. 28, 2005, all of which applications are expressly incorporated herein by reference in their entirety.

BACKGROUND

The present disclosure is related to system for dispensing a selected volume of liquid. In particular, the present disclosure is related to a system for dispensing a selected volume of liquid for use in brewing a beverage, such as, for example, coffee.

Current beverage making apparatuses employ a variety of techniques to control the volume of liquid dispensed during a beverage making process. It is desirable to have a preselected volume of beverage dispensed to prevent "short potting," a condition where less than the intended volume of beverage is dispensed. As an example, but not by way of limitation, during the production of coffee, a short pot would mean that an insufficient volume of water would be combined with coffee grounds, resulting in a coffee beverage having a resulting flavor, extraction or other characteristics, that are different than intended, and thus not having the desired taste or meeting other criteria.

Briefly, and in accordance with the foregoing, disclosed is a system and method of dispensing a selected volume of liquid. The system includes an apparatus that has a reservoir having an inlet tube and outlet tube coupled thereto, and a controller for controlling at least a portion of the apparatus. Two level sensors are positioned along the reservoir and are in communication with and controlled by the controller. The method includes steps for measuring a time a liquid level in the reservoir falls from an upper level to a lower level to calculate a flow rate. The calculation flow rate may then be used to determine and compare a dispensed volume versus the selected volume. Dispensing may then continue until the selected volume has been dispensed. While the method and apparatus is shown and describes for use with beverage dispensing, this is provided by way of illustration and not limitation.

Additional features and embodiments will become apparent to those skilled in the art upon consideration of the following detailed description of drawings.

BRIEF DESCRIPTION OF THE DRAWINGS

The present disclosure will be described hereafter with reference to the attached drawings which are given as a non-limiting example only, in which:

FIG. 3 is a flow diagram showing steps for calibrating a system for dispensing a selected volume of liquid;

FIG. 4 is a simplified flow diagram showings an operation of a system for dispensing a selected volume of liquid;

FIG. 5 is formula for calculating a remaining time to hold an outlet valve open to dispense a selected volume of liquid; and FIGS. 6A-B show a derivation of the formula of FIG. 5.

Figure 1:
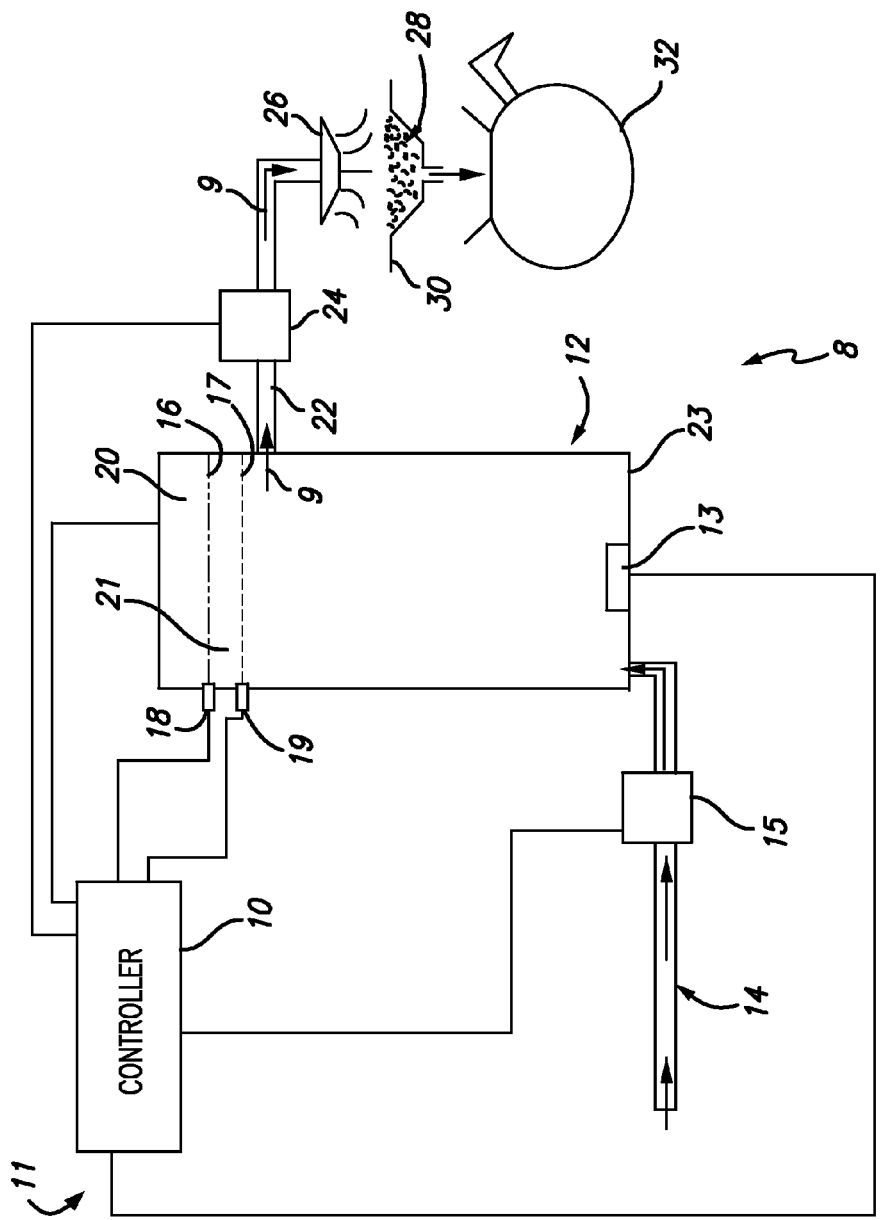
FIG. 1 is a simplified diagram of a system for controlled dispensing of a selected volume of liquid.

The exemplification set out herein illustrates embodiments of the disclosure that is not to be construed as limiting the scope of the disclosure in any manner.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

The present disclosure provides an apparatus, system, and method for controlled dispensing of liquid which may be used with a beverage maker or beverage brewer. Terms including beverage, brewed, brewing, brewing substance, beverage preparation material, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include, but is not limited to, beverage substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product.

As shown in FIG. 1, an apparatus 8 for dispensing liquid 9 includes a controller 10 coupled to various components or controllable devices associated with an inlet liquid or water delivery assembly, which may include a liquid reservoir 12 and which controls or receives information from at least a portion of a beverage maker that is associated with the apparatus 8. When apparatus 8 is used in beverage machines that produce a heated beverage, such as coffee, tea, or soup, liquid reservoir 12 may include a heater, such as heating element 13 associated therewith to heat the liquid to a predetermined temperature or within a range of temperatures. Such a heating element 13 is coupled to and controlled by controller 10. Alternatively, for ambient temperature liquid dispensing apparatuses, the heating element 13 is not activated or no heating element may be needed. The present disclosure may also be used for cooled liquid dispensing in which case a cooling element or system would be used instead of a heating element. An inlet tube 14 is coupled to and communicates with liquid reservoir 12 for dispensing liquid into liquid reservoir 12. An inlet valve 15 is coupled with or otherwise positioned along inlet tube 14. Inlet valve 15 may be coupled to controller 10 for controllably permitting or restricting flow when the particular application may so require, or may be operated independently of controller 10.

Associated with reservoir 12 is a first level sensor 18, coupled to controller 10, and positioned at a first level 16 above a bottom 23 of reservoir 12 which senses whether liquid in reservoir 12 reaches the first level 16. A second level sensor 19, coupled to controller 10, and positioned at a second level 17 above bottom 23 which senses whether liquid in reservoir 12 reaches second level 17. Second level 17 is below level first level 16. Any suitable level sensor may be used including a conductance based level sensor positioned within the interior of reservoir 12, a capacitive level sensor, sonic level sensor, optical level sensor or weight driven level sensor associated with reservoir 12.

A volume 21 is defined between levels 16, 17 in reservoir 12. Various distances between level sensors 18 and 19 may be used to select volume 21, such as, by way of example but not limitation, 0.2 inches. Volume 21 would thus be calculated by multiplying the distance between levels 16 and 17 by a square of the radius of reservoir 12 by pi. Other embodiments in which reservoir 12 is not cylindrical may also be used, with volume 21 being calculated by using the cross-sectional dimensions of the reservoir together with the distance between levels 18, 19.

Liquid is controllably dispensed from reservoir 12 via outlet tube 22. An outlet valve 24 is associated with outlet tube 22 and is coupled to and controllably operated by controller 10. When outlet valve 24 is open, liquid can pass out of outlet tube 22. As an example, outlet tube 22 may lead to a spray head 26 to be distributed over beverage making material 28 positioned in a brew funnel 30 to allow the liquid, for example heated water, to contact the beverage making material, for example ground coffee, to make a desired beverage such as coffee. The brewed beverage is then passed into a container such as a coffee carafe 32 for distribution and consumption.

Figure 2:
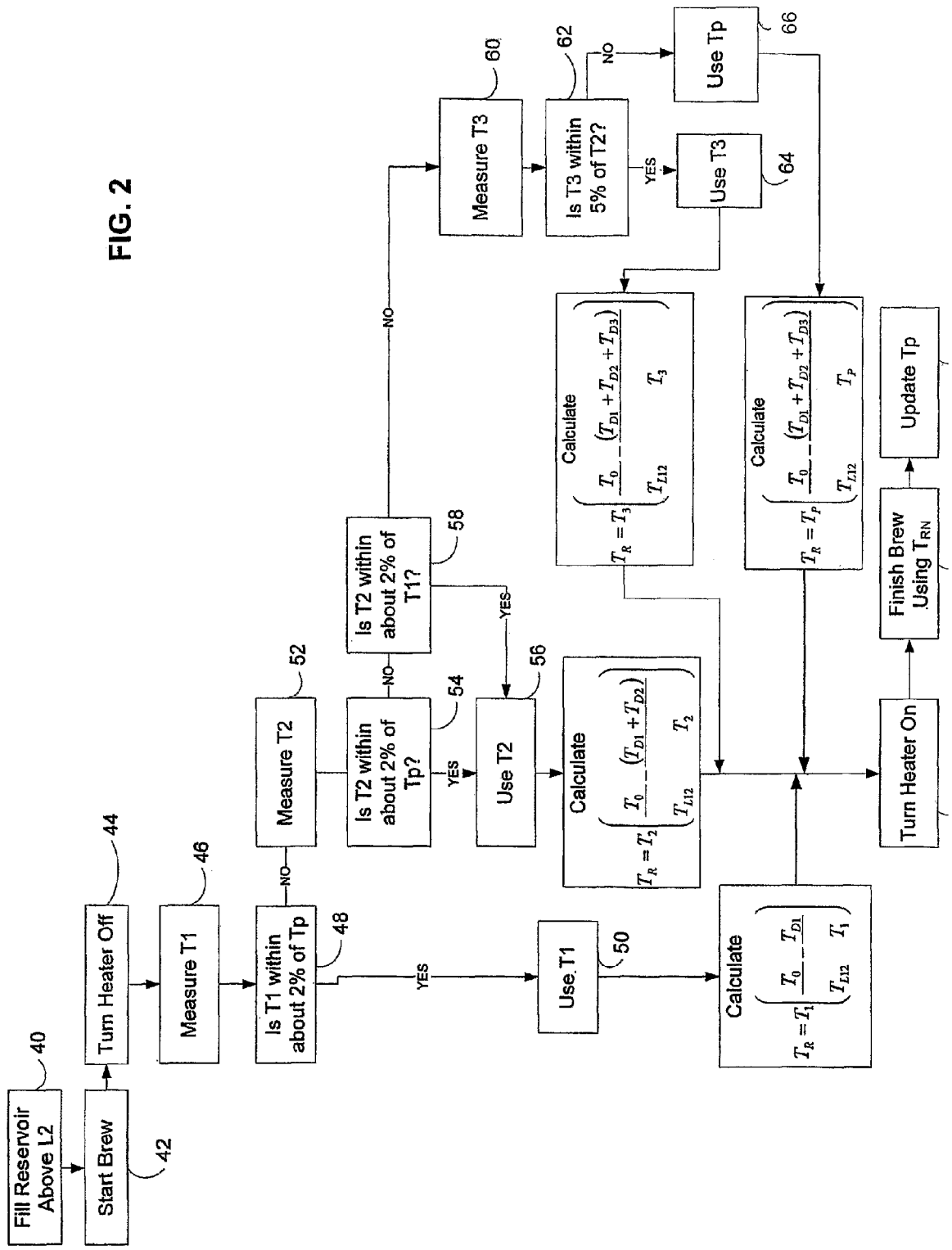
FIG. 2 is a flow diagram for a method of dispensing a selected volume over one beverage producing cycle.

Controller 10 can controllably operate apparatus 8 to dispense a selected volume of liquid, such as for example, one pot of coffee, or in larger commercial settings, one or more multi-serving beverage containers. One embodiment of a method to dispense a selected volume is shown in FIG. 2. For purposes of convenient illustration and description only, first level 16 is referenced as L2 and second level 18 is referenced as L1 herein.

In a first step 40, reservoir 12 is filled at above L2. A brew cycle is then started 42 and, in one embodiment in which the liquid is heated, the heating element or heater 13 is turned off. Heater 13 may be turned off to prevent a situation where the surface of the liquid stored reservoir 12 starts to boil, bubble, or otherwise vaporize as the liquid is heated. Such bubbling or vaporization may cause level sensors 18, 19 to erroneously report the liquid has reached those levels. The present method may be used in combination with more accurate level sensors that can account for, ignore, adjust for or cancel the effects of such conditions. However, where less expensive or more readily available level sensors are used, the heater 13 may be turned off to increase accuracy as described above.

Liquid is dispensed at this point by controllably operating outlet valve 24 to allow liquid to pass out through outlet tube 22. Volume 21 may be located above outlet tube 22 to create a head pressure to force liquid out tube 22 when outlet valve 24 is opened. The timing of opening outlet valve 24 in combination with level sensors 18, 19 detecting their respective levels conveniently allows controller 10 to determine a time T1 that it takes a liquid level to drop from L2 to L1 (step 46). This time in combination with determining known volume 21 allows simple calculation of a flow rate out outlet tube 22. That simple calculation may be flow rate equals known volume 21 divided by T1. At this point, the calculated flow rate may be used to calculate the time outlet valve 24 need to remain open to dispense the selected volume. Once T1 is calculated, inlet valve 15 is opened to allow reservoir 12 to refill to continue the brewing cycle.

Steps 48 through 66 represent an embodiment of the present method that may be used to account for discrepancies in the flow rate over at least a portion of the brewing cycle. These discrepancies may be caused by a variety of factors including but not limited to, turbulence within the reservoir, a power surge, movement of apparatus 8, a momentary inaccurate reading by one or both of the level sensors 16, 18, and other factors.

To account for such a discrepancy, T1 is compared to some previously calculated flow rate to see if the two rates are the same within a tolerance, to deem the calculated flow rate stable and thus reliable for timing calculations. In a step 48, for example, if T1 is within 2% of a previous measured or calibrated time Tp, T1 is used (step 50). If T1 is not within the selected tolerance, a second time T2, is measured (step 52). If T2 is within a selected tolerance, such as for example is 2% (step 54) of Tp or 2% of T1 (step 58), T2 is used (step 56). The comparison may be made to either of Tp or T1 because repeatability or stability is the desired trait of the timing measurements. If T2 is not within tolerance with respect to T1 or Tp, a third time T3 is measured, again as the time the liquid level falls from L2 to L1 (step 60). If T3 is within a selected tolerance, such as 5% of T2, T3 is used (step 64). Otherwise, Tp is used again because Tp apparently is the only stable time (66). The tolerance for the third sub-cycle to measure T3 may be less precise than for the previous two readings because stability is being measured over a longer period.

Although three sub-cycles are shown for determining a new Tp, more cycles may be used. However, in an embodiment where the liquid is heated, the heater may not be turned on until all the times have been measured (see step 68). As discussed above, having an activated heater while the level sensors are operating may cause less than optimal readings because of bubbling, vaporization, turbulence, or other factors. Limiting taking L2-L1 sub-cycle time measurements to only a subset of the total L2-L1 sub-cycles in a particular brewing cycle, allows a stable flow rate to be measured while allowing the heater to be reactivated within a reasonable time to allow the apparatus to be reset for another heating cycle. In one embodiment, between one and three L2-L1 sub-cycles are timed out of five total L2-L1 sub-cycles needed to dispense a selected volume for one brew cycle.

One embodiment of an initial calibration method is shown in FIG. 3. In a calibration environment, a brewing cycle is started (step 80). It is assumed the liquid level in the reservoir 12 is already at least at L2. In step 82, outlet valve 24 is opened to allow liquid to escape while controller 10 monitors the amount of time it takes the liquid level in the reservoir to drop from L2 to L1. Once the first L2-L1 cycle is completed, the inlet valve 15 is opened to permit refilling of reservoir 12. A count of the number of L2-L1 cycles, designated hereinafter as N, is kept (step 84). The total number of cycles N may include a partial cycle because outlet valve 24 may close prior to the completion of that last cycle if the selected volume has been dispensed. Therefore the actual number of full cycles may be designated N−1.

An average flow rate Ro may then be calculated as shown in step 86, as being equal to $(N \times Q_{L12})/T_{L12}$, where $Q_{L12}$ is volume 21, and $T_{L12}$ is time it takes the level to fall from L2 to L1. Controller 10 may be programmed to measure a total outlet time to (step 88) which is used to calculate the total dispensed volume Qo in the formula shown in step 90.

A method for dispensing a selected volume Qo during operation of the apparatus 8 is shown in FIG. 4. A brew cycle 92 is started. An initial outlet valve open time, referred to herein as Vo, is calculated using the values calculated during the calibration cycle, such as shown in FIG. 3, or using values from one or more previous brew cycles (step 94). An L2-L1 sub-cycle is started (step 96) with flow rate Ro being recalculated (step 98). The series of L2-L1 times used to calculate the new flow rate may be selected based on the stability considerations discussed for FIG. 2. The dispensed volume is monitored in step 100 against the selected dispensed volume (Step 102). If Qo has not been dispensed (step 104), a remaining Vo on-time, designated herein as TRn, is calculated and another L2-L1 sub-cycle is permitted. Otherwise, outlet valve 24 is shut and the brew cycle is ended (step 106).

The remaining valve open time may be recalculated several times over the course of the brew cycle depending on the flow rate calculated for the L2-L1 sub-cycles. A formula 110 is shown in FIG. 5 for calculating the remaining Vo on-time after N cycles, where TDx is the time from end of the previous cycle to the end of the current cycle x. A derivation of the formula is shown in FIG. 6A-B, where the bottom of 6A continues to the top of 6B.

It is envisioned that a software module may be used to retrofit an existing beverage machine to provide for the controlled liquid dispensing described above. The term "module" referenced in this disclosure is meant to be broadly interpreted and broadly cover various types of software code including but not limited to routines, functions, objects, libraries, classes, members, packages, procedures, methods, or lines of code together performing similar functionality to these types of coding. The retrofit may include, but is not limited to, adding a new controller module or component, updating an existing controller with the software module through any available programming method, including flashing a controller's memory, replacing a chip, replacing a circuit board, or copying and running software code on memory accessible to a controller's microprocessor. The software module may be included as part of a retrofit kit for updating an existing dispensing machine to include the functionality describe above. It is also envisioned that kit may be used to retrofit an existing beverage maker that lacks a flow regulator. Thus an alternative version of the kit may include a flow regulator and sufficient components and instructions for connecting it to the inlet line and a software module.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. An apparatus for controlled beverage dispensing in a beverage maker, the apparatus comprising:
   a controller for controlling at least a portion of the apparatus;
   a reservoir;
   an inlet tube in communication with the reservoir for directing liquid into the reservoir;
   an outlet tube positioned along the reservoir;
   an outlet valve positioned along the outlet tube, the outlet valve being in communication with and controlled by the controller;
   a first level sensor positioned along the reservoir at a first level, the first level sensor being coupled to the controller;
   a second level sensor positioned along the reservoir at a second level below the first level, the second level sensor being coupled to the controller;
   the controller including means to measure a time T for a liquid level in the reservoir to fall from the first level to the second level;
   the controller being operative to calculate a flow rate by dividing a volume inside the reservoir between the first level and the second level by T; and
   the controller being operative to compare a subsequently determined flow rate to a previously determined flow rate, and allowing the outlet valve to one of remain open a longer total dispensing time when the subsequent flow rate is less than the previously determine flow rate by more than a predetermined tolerance and close sooner than a total dispensing time when the subsequent flow rate is greater than the previously determine flow rate by more than a predetermined tolerance.

2. The apparatus of claim 1, further comprising an inlet valve positioned along the inlet tube, the inlet valve being in communication with and controlled by the controller.

3. The apparatus of claim 1, further comprising a spray head positioned at an end of the outlet tube.

4. The apparatus of claim 1, further comprising the controller being operative to only use a flow rate in calculation of the total dispensing time when the flow rate is a stable flow rate, the stable flow rate being determined by comparison to one or more previously determined flow rates.

5. The apparatus of claim 4, further comprising the flow rate being a stable flow rate when the flow rate is within about two percent of a one or more previously determined flow rates.

6. The apparatus of claim 1, wherein each of the first level sensor and the second level sensor are one of a capacitive level sensor, a sonic level sensor, an optical level sensor, and a weight driven level sensor.

7. The apparatus of claim 1, wherein the distance between the first level and second level is about 0.2 inches.

8. An apparatus for controlled beverage dispensing in a beverage maker, the apparatus comprising:
   a controller for controlling at least a portion of the apparatus;
   a reservoir;
   an inlet tube in communication with the reservoir for directing liquid into the reservoir;
   an inlet valve positioned along the inlet tube, the inlet valve being coupled to and controlled by the controller;
   an outlet tube positioned along the reservoir;
   a first level sensor positioned along the reservoir at a first level, the first level sensor being coupled to the controller;
   a second level sensor positioned along the reservoir at a second level below the first level, the second level sensor being coupled to the controller;
   the controller including means to measure a time T for a liquid level in the reservoir to fall from the first level to the second level;

the controller being operative to calculate a flow rate by dividing a volume inside the reservoir between the first level and the second level by T; and the controller being operative to compare a subsequently determined flow rate to a previously determined flow rate, and allowing the inlet valve to one of remain open a longer total dispensing time when the subsequent flow rate is less than the previously determine flow rate by more than a predetermined tolerance and close sooner than a total dispensing time when the subsequent flow rate is greater than the previously determine flow rate by more than a predetermined tolerance.

9. A method for controlled beverage dispensing in a beverage maker, the method comprising:

providing a controller for controlling at least a portion of the beverage maker, a reservoir, an outlet tube positioned along the reservoir, a first level sensor positioned along the reservoir at a first level, the first level sensor being coupled to the controller, a second level sensor positioned along the reservoir at a second level below the first level, the second level sensor being in coupled to the controller, an inlet tube and an outlet tube positioned along the reservoir, an inlet valve along the inlet tube, and an outlet valve along the outlet tube, the inlet valve and outlet valve each in communication with and controlled by the controller;

filling the reservoir by opening the inlet valve with liquid at a level at or above the first level;

opening the outlet valve to dispense liquid from the outlet tube;

using the controller to measure a time T for the liquid level to fall from the first level to the second level;

using the controller to calculate a flow rate by dividing a volume inside the reservoir between the first level and the second level by T;

refilling the reservoir to a level at or above the first level by controllably operating the inlet valve;

using the controller to compare a subsequently determined flow rate to a previously determined flow rate, and allowing the outlet valve to one of remain open a longer total dispensing time when the subsequent flow rate is less than the previously determine flow rate by more than a predetermined tolerance and close sooner than a total dispensing time when the subsequent flow rate is greater than the previously determine flow rate by more than a predetermined tolerance; and continuing the dispensing and refilling steps until a selected volume has been dispensed.

10. The method of claim 9, further comprising determining when the selected volume has been dispensed by calculating a flow rate by dividing a volume of liquid between the first level and second level by time T, measuring a total time the outlet valve remains open during the dispensing cycle and multiplying the total time by the flow rate.

11. The method of claim 10, further comprising detecting discrepancies in the flow rate to identify a stable flow rate, and using the stable flow rate in determining when the selected volume has been dispensed.

12. The method of claim 11, the step of detecting discrepancies comprising comparing a current flow rate to a previously determined flow rate, and designating the current flow rate as the stable flow rate when the current flow rate is within a selected tolerance of the previously determined flow rate.

13. The method of claim 12, the selected tolerance being about 2%.

14. The method of claim 12, the step of detecting discrepancies further comprising comparing a current flow rate to two or more previously determined flow rates, and designating the current flow rate as the stable flow rate when the current flow rate is within a selected tolerance of any of the previously determined flow rates.

15. The method of claim 14, further comprising extending a dispensing period where the stable flow rate is less than a previously determined stable flow rate.

16. The method of claim 9, further comprising
performing an initial calibration operation, the calibration operation comprising:
starting a beverage dispensing cycle;
filling the reservoir with liquid above the first level; opening the outlet valve to allow liquid to exit while measuring a time the liquid level falls from first level to the second level;
cyclically refilling the reservoir above the first level by operating the inlet valve, and allowing the liquid level to fall from the first level to the second level by operating the outlet valve to define a sub-cycle, measuring the total number of sub-cycles N to dispense the selected volume; and
calculating an initial flow rate based on N−1 sub-cycles; and
setting an initial dispensing time based on the initial flow rate.

17. The method of claim 9, further comprising heating the liquid during one of refilling liquid and storing liquid in the reservoir, and controllably deactivating heating during sensing of at least one of the first level and second level.

18. A method for controlled beverage dispensing in a beverage maker, the method comprising:

providing a controller for controlling at least a portion of the beverage maker, a reservoir, an outlet tube positioned along the reservoir, a first level sensor positioned along the reservoir at a first level, the first level sensor being coupled to the controller, a second level sensor positioned along the reservoir at a second level below the first level, the second level sensor being coupled to the controller, an inlet tube and an outlet tube positioned along the reservoir, an inlet valve along the inlet tube and coupled with and controlled by the controller;

filling the reservoir by opening the inlet valve with liquid at a level at or above the first level;

using the controller to measure a time T for the liquid level to fall from the first level to the second level;

using the controller to calculate a flow rate by dividing a volume inside the reservoir between the first level and the second level by T;

refilling the reservoir to a level at or above the first level by controllably operating the inlet valve;

using the controller to compare a subsequently determined flow rate to a previously determined flow rate, and allowing the inlet valve to one of remain open a longer total dispensing time when the subsequent flow rate is less than the previously determine flow rate by more than a predetermined tolerance and close sooner than a total dispensing time when the subsequent flow rate is greater than the previously determine flow rate by more than a predetermined tolerance; and continuing the dispensing and refilling steps until a selected volume has been dispensed.

\* \* \* \* \*